US012715741B2

(12) United States Patent
Cockell, II

(10) Patent No.: US 12,715,741 B2
(45) Date of Patent: Aug. 25, 2026

(54) DROGUE FOR A LOAD AND RELATED SYSTEMS

(71) Applicant: Vita Inclinata IP Holdings LLC, Broomfield, CO (US)

(72) Inventor: Robert C. Cockell, II, Medford, OR (US)

(73) Assignee: Vita Inclinata IP Holdings LLC, Denver, CO (US)

( * ) Notice: Subject to any disclaimer, the term of this patent is extended or adjusted under 35 U.S.C. 154(b) by 442 days.

(21) Appl. No.: 18/214,350

(22) Filed: Jun. 26, 2023

(65) Prior Publication Data

US 2024/0425327 A1 Dec. 26, 2024

Related U.S. Application Data

(60) Provisional application No. 63/335,670, filed on Apr. 27, 2022.

(51) Int. Cl.

| | |
|---|---|
| ***B66C 13/04*** | (2006.01) |
| ***A61G 1/04*** | (2006.01) |
| *B64D 1/22* | (2006.01) |

(52) U.S. Cl.

CPC ................ *B66C 13/04* (2013.01); *A61G 1/04* (2013.01); *A61G 2220/10* (2013.01); *B64D 1/22* (2013.01)

(58) Field of Classification Search

CPC ...... B66C 13/04; B64D 1/22; A61G 2220/10; A61G 1/04

USPC .................................................................. 5/81.1

See application file for complete search history.

(56) References Cited

U.S. PATENT DOCUMENTS

| | | | | |
|---|---|---|---|---|
| 1,256,281 A * | 2/1918 | Ahern | B63B 19/04 | 454/81 |
| 2,969,210 A * | 1/1961 | Richardson | B64D 1/22 | 258/1.2 |
| 5,421,757 A | 6/1995 | Basiliere | | |
| 2010/0263126 A1* | 10/2010 | Campani | B64D 1/22 | 5/629 |

* cited by examiner

*Primary Examiner* — David R Hare
*Assistant Examiner* — Joseane E. Tejada
(74) *Attorney, Agent, or Firm* — Martin Spencer Garthwaite

(57) ABSTRACT

A drogue for stabilizing a load suspended from a carrier may include a sidewall comprising a sheet material. The sheet material defines a perimeter edge having a coupling portion and leading edge, where the coupling portion has a trailing edge opposing the leading edge, and a side edge extending between the leading edge and the trailing edge. The drogue also includes a coupling element configured to detachably connect the trailing edge and the side edge to a load having a load surface and an opposing bottom surface, wherein the sidewall is positioned below the bottom surface of the load when so detachably connected.

17 Claims, 8 Drawing Sheets

DROGUE FOR A LOAD AND RELATED SYSTEMS

CROSS-REFERENCE TO RELATED APPLICATION

This application is a non-provisional of, claims the benefit of the filing date of, and incorporates by this reference U.S. provisional patent application No. 63/335,670, filed Apr. 27, 2022.

FIELD

This application and related subject matter (collectively referred to as the "disclosure") generally concern air transport systems, and related components and methods. More particularly, but not exclusively, this disclosure pertains to a drogue that is attachable to a load such as an air rescue litter for stabilizing the load when airborne.

BACKGROUND INFORMATION

Helicopters and other carriers (including fixed-wing aircraft, line-systems, and cranes) may be used to lift and transport loads (hereinafter, referred to as a "carrier"). This may referred to as "airlifting" or an "airlift operation". Airlift operations may occur in terrain that is not accessible to or is dangerous for wheeled vehicles. For example, helicopters can be used to transport personnel, equipment, ill or injured people, and the like to or from areas with steep terrain, e.g. mountain sides, or from locations where objective hazards, such as military activity, rock falls, avalanches, waterfalls, wildlife, and the like makes it difficult, dangerous, or slow for personnel on foot or in wheeled vehicles to enter and or leave the location.

Many airlift operations use a harness or litter, attached to the helicopter or carrier with a cable system, that hangs below the carrier during transport. For relatively short flights, known as "short haul" airlifts, the litter may remain below the carrier at a fixed distance. For longer flights, the litter may be hoisted up towards the carrier, may be secured proximate to, in, or on the carrier. During a hoisting operation, the carrier may remain relatively stationary in the air until the load is raised, to minimize air flow on the load due to forward flight. However, this may be dangerous, for example, in military contexts where the helicopter may be a target for attack if it remains on the scene and or in situations where time is off the essence, such as when transporting an injured person.

In both short-haul and hoist situations, the suspended load is subject to air currents from multiple directions, including downdraft from rotors of the carrier, ambient wind, and air flow from flight. This can cause undesirable and potentially dangerous spinning and pitching of the suspended load.

SUMMARY

Solutions to prevent spinning and/or pitching of a load suspended from a helicopter have included a towed drag element that causes drag, such as a drag parachute, a drogue parachute, or wind-sock device tethered to and separated from the rear of the load by a tether such as a rope or cable. Such towed drag elements, however, may need to be deployed by an operator once the litter is airborne. Tethers securing the drag element to the carrier may tangle, which may prevent the drag element from full deployment. The drag element may be at risk of getting caught in rotor wash and tangled around a rotor or another component of the carrier or another object in the environment. Furthermore, the drag element may produce turbulence, in addition to drag; such turbulence may cause yaw or other undesired movement of the load and or of the carrier.

Concepts, systems, methods, and apparatus disclosed herein overcome one or more problems of previous approaches. As but one illustrative example, an improved drogue for stabilizing a rescue litter may provide a sheet material having sides that couple to the rescue litter without the use of a tether. As used herein, the term "side" or its plural "sides" means "edge." The sheet material drapes below the bottom of the litter forming a scoop with an inlet or mouth facing a leading edge (e.g., the front) of the litter relative to a forward flight direction. A rear edge of the sheet material may be attached to a corresponding rear side or edge of the litter to close at least a region of the rear of the scoop. In embodiments, the scoop may have an airfoil cross-section, wherein the sheet material tapers from the leading edge of the scoop to the trailing edge across an airfoil trailing portion of the drogue; the airfoil cross-section may increase laminar airflow across the airfoil trailing portion of the drogue, may reduce turbulence compared to a drag element with a square, rectangular, or semi-circular cross-section, and may produce a downward lift force on the drogue and load. In embodiments, attachment of the drogue to the load may leave one or more segments of the trailing edge or side edge of the sheet material unattached to the load or to a roof of the drogue ("edge vents") to permit air to flow between the load and the sheet material. In embodiments, the drogue may comprise openings in the sheet material ("scoop vents"). Together, edge vents and scoop vents may be referred to herein as "vents". The vents may allow airflow through the scoop, which may reduce turbulence produced by the drogue.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

Figures 1A, 1B, 1C:
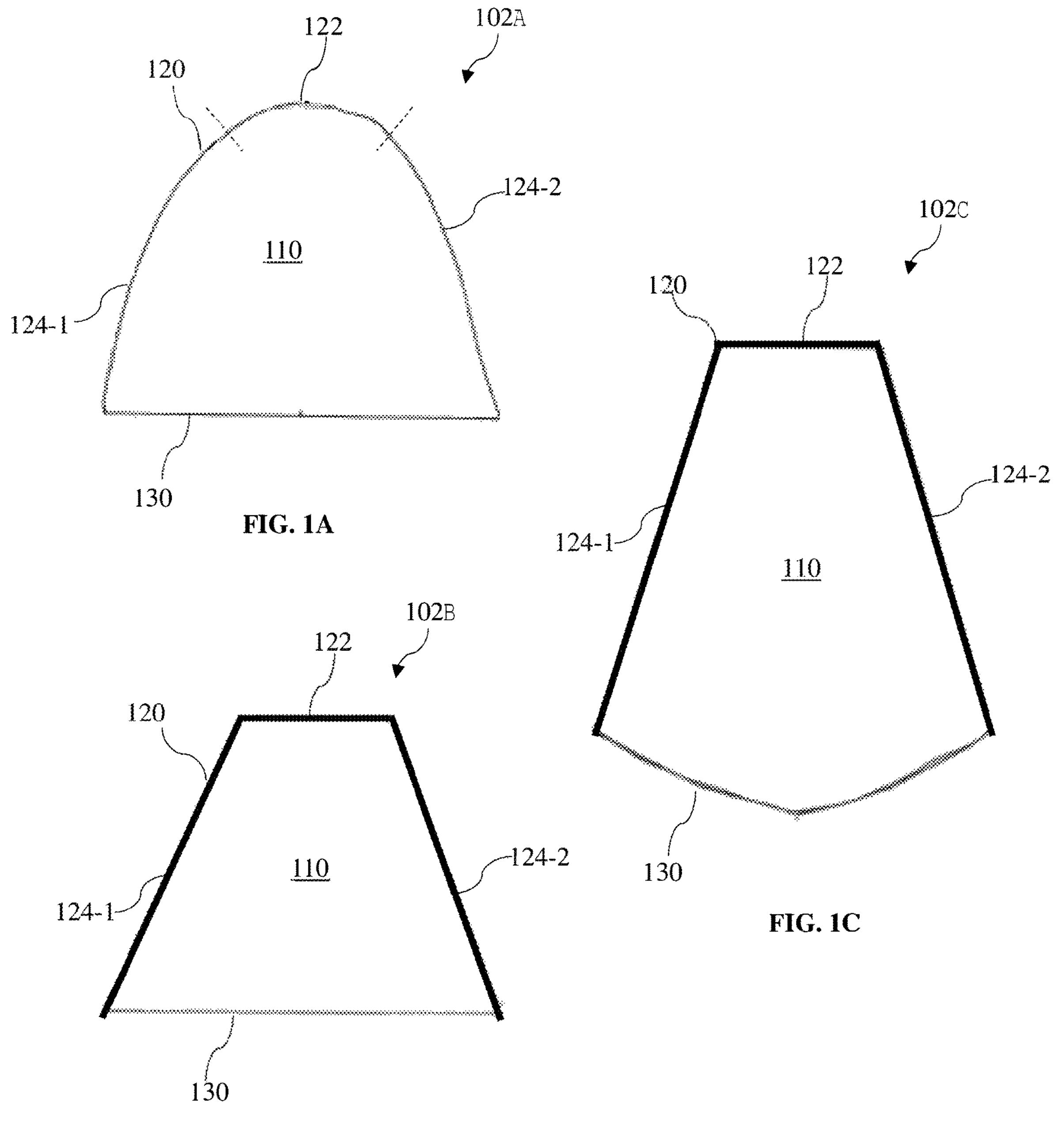
FIGS. 1A-C illustrate several examples of drogues in plan view.

The following describes various principles related to a drogue and or drogue parachute (referred to herein as a "drogue") for a rescue litter or other load (referred to herein as a "load"), and related systems and methods. For example, some disclosed principles pertain to systems, methods, and components of a drogue attached to a load (as opposed to being tethered from a load), wherein the drogue may be attached to a bottom of the load, to provide stabilizing drag and or downward lift when the load is hanging in the air beneath a carrier and to flatten or otherwise collapse when the load is placed on a solid surface. That said, descriptions herein of specific apparatus or system configurations are but particular examples of contemplated drogues chosen as being convenient illustrative examples of disclosed principles. One or more of the disclosed principles can be incorporated in various other drogues to achieve any of a variety of corresponding, desired characteristics. Thus, a person of ordinary skill in the art, following a review of this disclosure, will appreciate that drogues having attributes that are different from those specific examples discussed herein can embody one or more presently disclosed principles, and can be used in applications not described herein in detail. Such alternative embodiments also fall within the scope of this disclosure.

Overview

Examples of drogues that do not need to be deployed separately from a primary deployment of a rescue litter or other load while airborne, and that omit conventional tethers, overcoming common problems of prior art drag chutes while retaining and improving on their benefits, are described herein. Once installed onto a litter, these exemplary drogues may be collapsed and redeployed repeatedly without the need for a human operator, for example to repack, as in a parachute, or to wind up tether material. Rather, disclosed drogues are flexible and can collapse when the litter is stationary and can automatically deploy (e.g., inflate) when the litter to which it is attached is in motion. Air flowing into the exemplary drogues provides a suitable drag force and or downward lift force to stabilize a load such as a litter suspended from (i.e., tethered to) a carrier, such as a helicopter, while in flight, even while the carrier is simultaneously flying forward and hoisting the litter.

Such a drogue may comprise a sheet material that may be permanently affixed to a litter or other load or detachably coupled to the load at a position aft of a center-of-gravity or a center-of-drag of the load. The resulting drogue can be affixed or coupled to outward-most sides of the load or litter or to anchors that flank a longitudinal center line of the load, while still being positioned inward of the sides of the load. A partial or a whole segment of a leading edge (also referred to as an inlet edge) of the sheet material remains detached from the load and drapes below the bottom side of the load to form a scoop or pouch into which air flows when the drogue is inflated or otherwise in use. In some embodiments, e.g., when the sheet material is a flexible sheet material, the leading edge can be weighted. To weight the leading edge, the leading edge may be folded back and secured to the sheet material itself to define an interior void which may be filled with sand or other weighted matter to help ensure that the mouth of the scoop opens as the load lifts away from the ground or other solid surface. When the drogue is on a bottom of the load and when the load is placed on a solid surface, such as the ground or a gurney, the sheet material collapses or flattens beneath the load. In other embodiments, the sheet material can be a resiliently compliant material that allows the drogue to collapse but tends to regain its open, inflated shape when the litter is lifted from the surface. In such embodiments, the flexibility of the drogue allows the sheet material to remain coupled to the load indefinitely, including while on the solid surface without interfering with the stability of the load on the solid surface. The sheet material is also ready to function as a drogue again as soon as the load is suspended in the air, because it is already attached to the load and can inflate (regardless of whether the drogue's leading edge is weighted, or the body of the drogue is resiliently collapsible). Additionally, once attached to the load, the drogue does not need to be manually deployed by an operator, as with tethered drogues.

In embodiments, a pouch of the drogue has an airfoil cross-section, wherein the airfoil cross-section is formed by a taper from the leading edge of the pouch to a trailing edge of the pouch across an airfoil trailing portion of the pouch. When inflated, the airfoil trailing portion and airfoil cross-section may increase a likelihood that airflow over the pouch is laminar, may reduce turbulence behind the drogue compared to a drogue with a rectangular, square, or hemispherical cross-section, and may also produce a downward lift force on the pouch and a load to which the drogue may be attached.

While the load is suspended in the air beneath a carrier, either in a short haul flight or while being hoisted, air may flow into the inlet or mouth of the drogue, fill the pouch, and produce a rearward drag force on the sheet material and thus on the litter. The taper of the airfoil trailing portion of the pouch may facilitate laminar airflow over the airfoil trailing portion, which may reduce turbulence and may produce a downward lift force on the pouch. The net effect of the rearward drag force and or the downward lift force may be to reduce or prevent undesired pitch and yaw of the load. This may permit a helicopter or other carrier to fly forward during a hoist operation, improving safety and allowing the hoist operation to be performed at higher speed, e.g. in military contexts, emergency evacuations, and other contexts in which time is of the essence.

Examples of Drogues

FIG. 1A to FIG. 1C illustrate several examples of drogues. FIG. 1A shows drogue 102A having walls comprising sheet material 110 which form a pouch. Sheet material 110 may define a perimeter edge. The perimeter edge may comprise leading edge 130 (e.g., inlet side), side edges 124-1 and 124-2, and tailing edge 122 (e.g., an aft side). Coupling portion 120 of drogue 102A may comprise portions of drogue 102A coupled to a load, e.g. some or all of side edges 124-1 and 124-2 and tailing edge 122. In the example illustrated in FIG. 1A, coupling portion 120 may be generally arcuate. Trailing edge 122 may generally oppose leading edge 130; side edges 124-1 and 124-2 may extend between leading edge 130 and trailing edge 122. On an arcuate coupling portion, aft "side" or trailing edge 122 may correspond to the portion at the top of the curve, for example, as shown between the two dashed lines in FIG. 1A.

FIG. 1B shows drogue 102B having sheet material 110 that is trapezoidal. Coupling portion 120 of drogue 102B, as indicated by the heavier line, comprises linear trailing edge 122, and two linear side edges 124-1, 124-2. Leading edge 130 of drogue 102B may be straight.

FIG. 1C shows drogue 102C having sheet material 110 with similar coupling portion 120 as shown in FIG. 1B, but with arcuate leading edge 130. Other shapes and configurations of the sheet material and pouch for a drogue are possible.

Trailing edge 122 is configured to attach to the aft end of a litter or other load and serve as the rear of an air scoop or pouch shape. Accordingly, a length of trailing edge 122 may generally correspond to the width of an aft end of the load, e.g. a width of a litter. For example, if the aft end of a litter is 24 inches wide, then the trailing edge may be between about 22 and 26 inches.

Generally, the length of leading edge 130 may be longer than the length of trailing edge 122. For example, the leading edge may be between 1.2 and 4.5 times the length of the trailing edge, e.g., 1.5, 1.75, 2, 2.5, 3, or 4 times the length of the trailing edge. A length of side edges 124 may be selected according to a proportion of the length of the sides of the litter. For example, the side edges may be between about ⅕ and ⅓ of the length of the litter, e.g., ⅖ or ¼.

Sheet material 110 may be selected from any durable, wind resistant, water resistant, and/or wind blocking fabrics. Some examples include, but are not limited to, rip-stop nylon, parachute fabric, sailcloth, PVC fabric, ballistic nylon, and polypropylene. Natural, synthetic or a blend of natural and synthetic fibers can be used. Fabrics that are slow to wear or tear in conditions that include sharp, thorny, or rocky surfaces may be preferred. Fabrics that are not inherently wind resistant or water resistant can be coated with a substance that renders the fabric resistant to wind and/or water. The sheet material may be a single layer of fabric or may include two or more layers of the same or differing fabrics. The embodiments are not limited to these examples.

Figure 2:
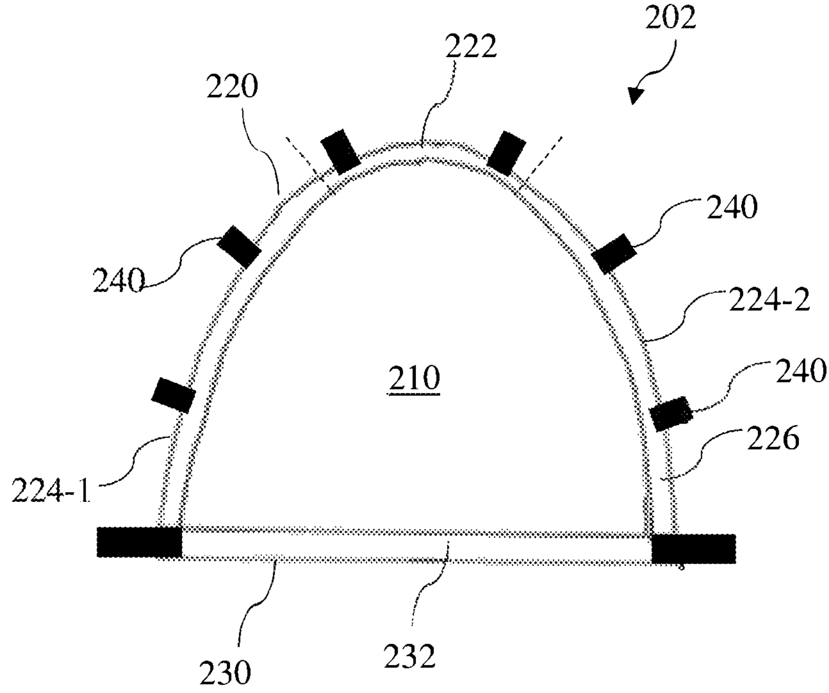
FIG. 2 illustrates another example of a drogue in plan view.

FIG. 2 illustrates an example of drogue 202 having one or more coupling elements 240 disposed along coupling portion 220. Coupling elements 240 may be configured to detachably connect trailing edge 222 and side edge(s) 224 to a rescue litter. Drogue 202 may have reinforced border 226 on coupling portion 220. Reinforced border 226 may be formed, for example, by folding over the edges of sheet material 210 one or more time and affixing the folded over edges to sheet material 210 by stitching, fusing, or adhesion to form a thicker portion. In another example, a thicker or otherwise more durable material than sheet material 210 may be attached to the edges of coupling portion 220.

Coupling elements 240 may be attached to reinforced border 226. Coupling elements 240 may be permanently attached to reinforced border 226. In another example, coupling elements 240 may be detachably coupled to reinforced border 226.

Coupling elements 240 may include, for example, one half of a buckle and receiver coupling, a clip, a clasp, a hook, a strap, or a carabiner clip. Coupling elements 240 may be configured to connect to a complementary structure on a rescue litter, such as a strap, a buckle, or a ring. Coupling elements 240 may comprise a cord or strap configured to loop through a structure on the rescue litter, such as a handle or a rigid ring or loop, and may be secured through a locking clasp, a cleat, or other mechanism. Coupling elements 240 may be a reinforced hole in the reinforced border, e.g., a grommet, through which a strap, cord, clasp, or other coupling mechanism on the rescue litter can connect.

In another example, instead of a plurality of discrete coupling elements, coupling element 240 may be one part of a two-part continuous coupling element, such as, for example, a magnetic strip extending along coupling portion 220 configured to magnetically couple to a magnetic component on a rescue litter; a zipper; a zipper-lock strip or a strip of hook and loop closure material extending along coupling portion 220.

Leading edge 230 of drogue 202 may include reinforced border 232, which may be formed similarly to reinforced border 226. No coupling elements are attached to reinforced inlet border 232, however, as leading edge 230 is configured to hang below and away from the bottom surface of a litter.

Figure 3:
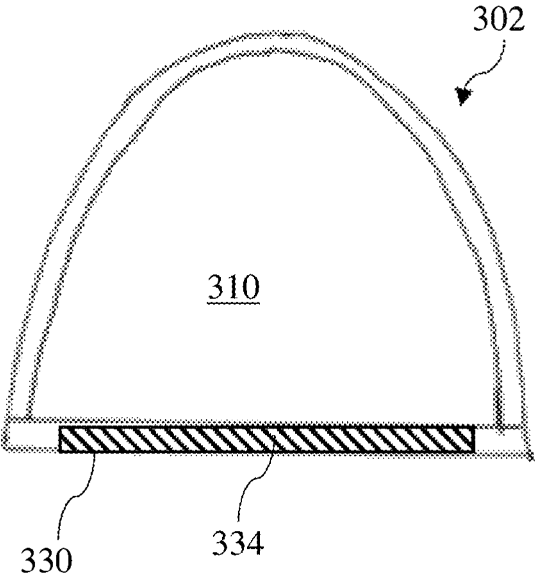
FIG. 3 illustrates a plan view of a drogue with one example of an inlet opener.
Figure 4:
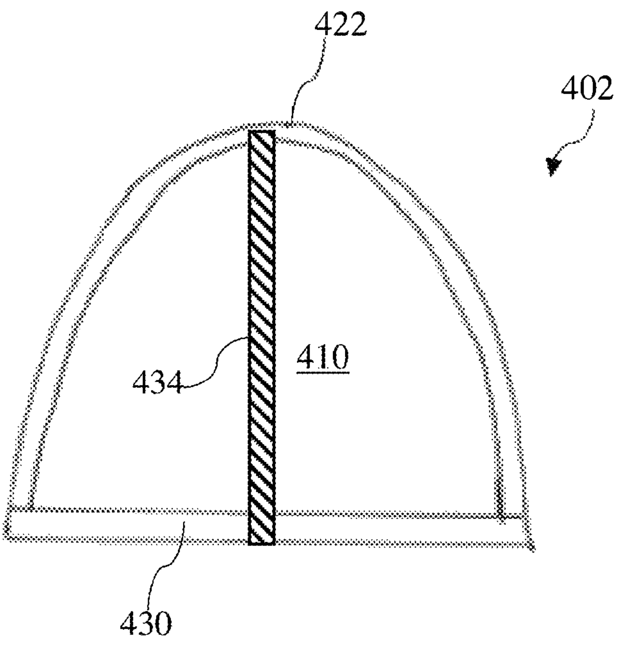
FIG. 4 illustrates a plan view of a drogue with a second example of an inlet opener.

As shown, for example, in FIGS. 3-4, some examples of drogues may further include an inlet opener configured to hold or bias the leading edge away from the rescue litter in an airborne configuration. The inlet opener may resist a collapse of the drogue in the air in response to turbulent conditions such as a sudden updraft that could press the sheet material up to the load and collapse the air volume within the scoop. In the event that the sheet material is temporarily collapsed against the load in the air, the inlet opener may cause the leading edge to return to its open configuration once the force that caused the collapse is removed.

The inlet opener is also configured to flatten against the load, e.g. rescue litter, when the load is placed on a solid surface such as a gurney, the ground, or the interior floor of a helicopter. This feature allows the load to remain as flat and stable as the solid surface permits.

FIG. 3 shows drogue 302 where inlet opener 334 is placed along leading edge 330. In one example, inlet opener 334 comprises a channel formed by folding over leading edge 330 of sheet material 310 and affixing the edge of the folded over portion to the sheet material, with a biasing material placed inside of the channel. The biasing material may comprise a dense material or a spring. The dense material may comprise, for example, sand, pebbles, ceramic or metal ball bearings, or any other material suitable for the purpose. An inlet opener that uses a dense material as a biasing material may return and keep the leading edge away from the litter through the force of gravity.

In another example, the biasing material may comprise a spring, such as a bar or coil spring of polyurethane, fiberglass, aluminum, steel, plastic, or wood, positioned inside of the channel. When the drogue is deployed under a load in is in the air, the flexible strip of material or spring presses radially outward on the channel, thereby pressing the leading edge away from the load and creating an inlet opening or mouth to intake air. When the load is placed on a solid surface, the flexible strip of material or spring may flatten under the weight of the load between the solid surface and the bottom of the load. In the flattened or collapsed position, the flexible strip may be tensioned such that once the weight of the load is lifted, the flexible strip returns to its curved shape. In another example, inlet opener 334 may be a separate element, e.g., a filled tube or flexible strip, attached to leading edge 330 by sewing, adhesion, or any other method of attachment.

FIG. 4 shows drogue 402 where inlet opener 434 is formed or attached between trailing edge 422 and leading edge 430 centrally on sheet material 410. As described above, inlet opener 434 may include a tube or channel with a biasing material, or a strip of flexible material.

In some examples, a drogue may have more than one inlet opener. For example, a drogue could include both inlet opener 334 and inlet opener 434. In another example, a drogue could include two or more inlet openers 434, each offset from a center of the sheet material.

Figure 5:
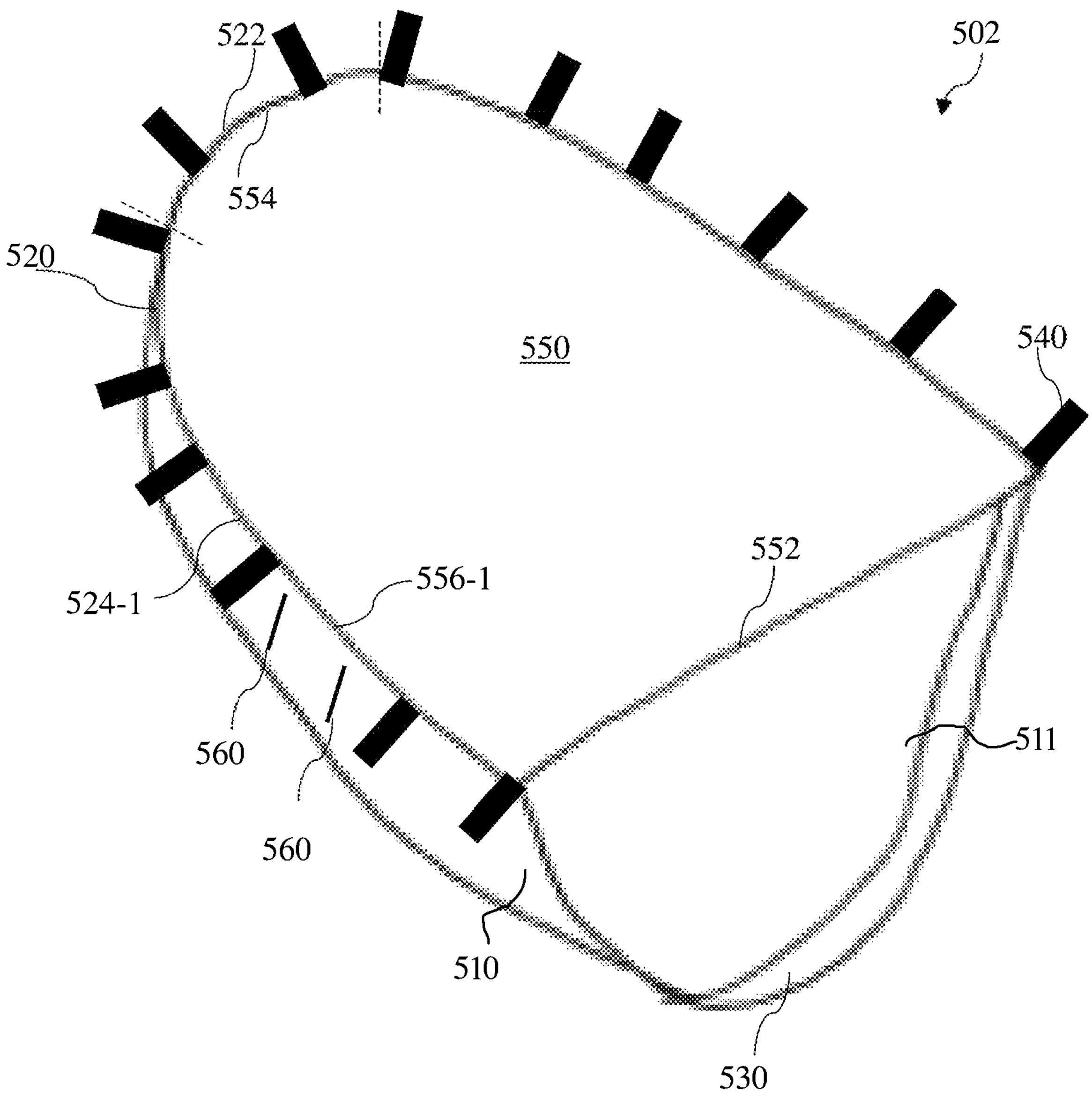
FIG. 5 illustrates an oblique perspective view of an example of a drogue having a roof.

FIG. 5 shows another possible example of drogue 502. In addition to sheet material 510, which may be analogous to any of sheet materials 110, 210, 310, or 410, drogue 502 may comprise a roof comprising sheet material 550; the roof may be proximate to the load. The roof may have second leading edge 552 (e.g., a roof leading edge), second trailing edge 554

(e.g., a second aft side), and second side edge 556-1. In the illustrated embodiment of FIG. 5, the leading edge and the trailing edge are contiguous with each second edge side 556-1 so that, together, these edges define a perimeter of the roof. Second trailing edge 552 may be coupled to trailing edge 522 of sheet material 510, and second side edge 556-1 may be coupled to side edge 524-1. Drogue 502 may also include one or more coupling elements 540 affixed along coupling portion 520.

In one example, sheet material 550 and sheet material 510 may be two separate sheets affixed to each other along coupling portion 520 of sheet material 510. In another example, sheet material 550 and sheet material 510 may be the same continuous piece of material formed or attached in a sock-like or tubular configuration.

The drogues illustrated in FIGS. 1-4 may allow some air to flow through the drogue, for example along the coupling portion if the coupling elements do not cause the coupling portion to seal against the litter. Drogue 502, due to its roof, may permit minimal or no air to flow through it in some embodiments. This may cause the drag pressure within the drogue to be too high or may cause additional turbulence downstream of the drogue, which in some, but not all, circumstances may destabilize the litter. Accordingly, the depicted embodiment of drogue 502 may be modified to include one or more vents 560 in sheet material 510 of the sidewall or the sheet material of roof 550 to allow at least some air to flow therethrough. In some embodiments, the coupling portion between roof 550 and body 510 of the drogue can have one or more segments where the perimeter of the roof is not coupled with a corresponding perimeter of the body to permit air to flow through the segment. In some embodiments, more than one such segment is provided, which can improve overall stability of the litter in some embodiments.

Drogue 502 may also include an inlet opener (not shown), as discussed above in reference to FIGS. 3 and 4.

Systems with Drogues

Figure 6:
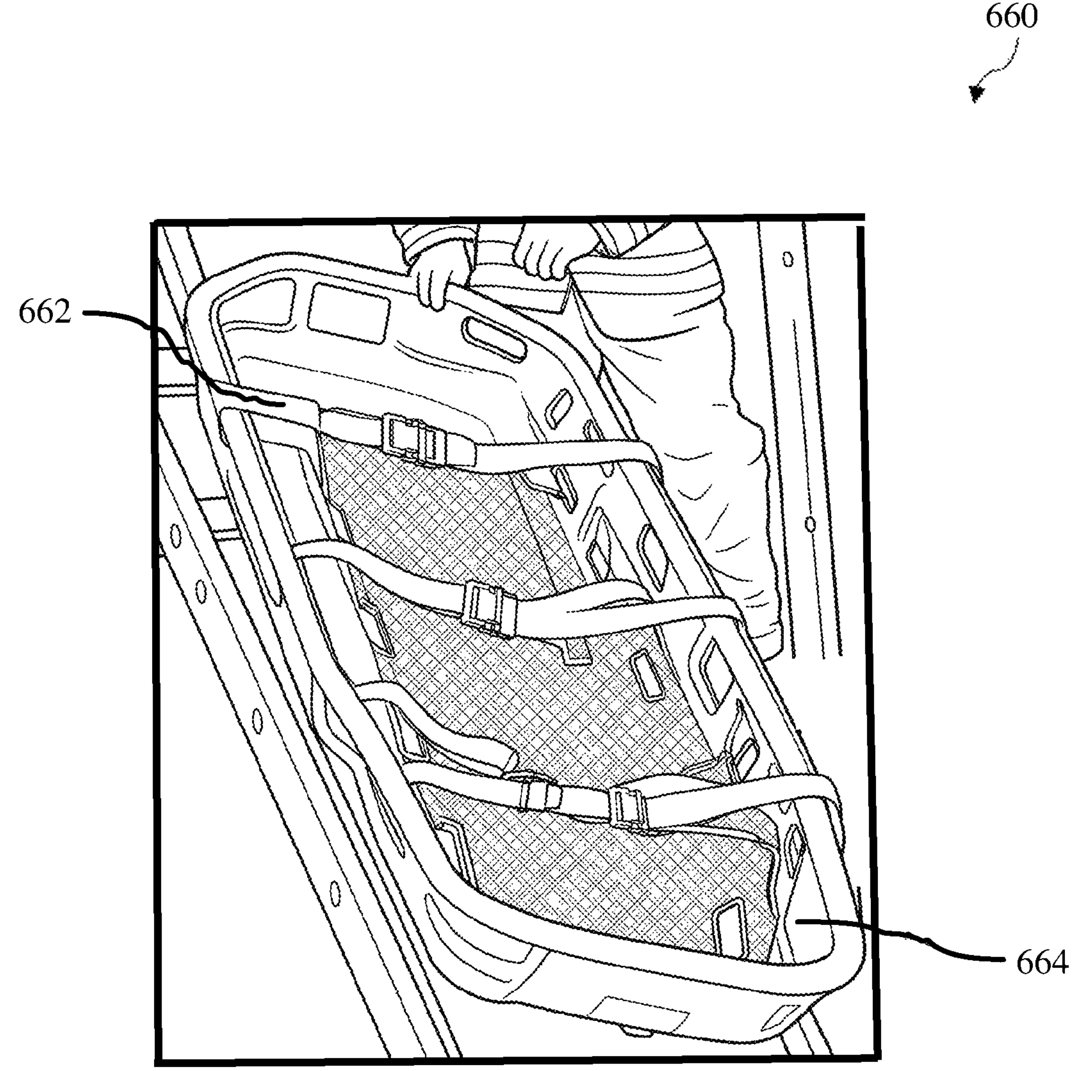
FIG. 6 illustrates an example of a litter.

FIG. 6 illustrates an example of litter 660, e.g. a load. Litter 660 may have bottom 662 and side 664. Bottom 662 may be generally planar and flat, and configured to receive a load, such as supplies or a person for transport. Bottom 662 may have a load surface which contacts the load, and a ground surface opposite the load surface, which contacts the ground or other solid surface when the litter is not airborne. While generally flat, bottom 662 may be contoured to stabilize and/or immobilize a person lying on it. Bottom 662 may include pads or cushions on the load surface to stabilize or immobilize the load. The size of bottom 662 may be selected according to an intended load. For example, a rescue litter to transport an adult human may be approximately 6.5 feet long and 2.5 to 3 feet wide.

Side wall 664 may rise upward from the bottom surface and may prevent the load from sliding off of the bottom surface. Side wall 664 may also include some openings to allow restraining straps to be threaded therethrough. Side wall 664 may include other openings that serve as handles, to allow a hand to grip the edge of the side. Other configurations of litters may be used. The embodiments are not limited to this example.

Figure 7:
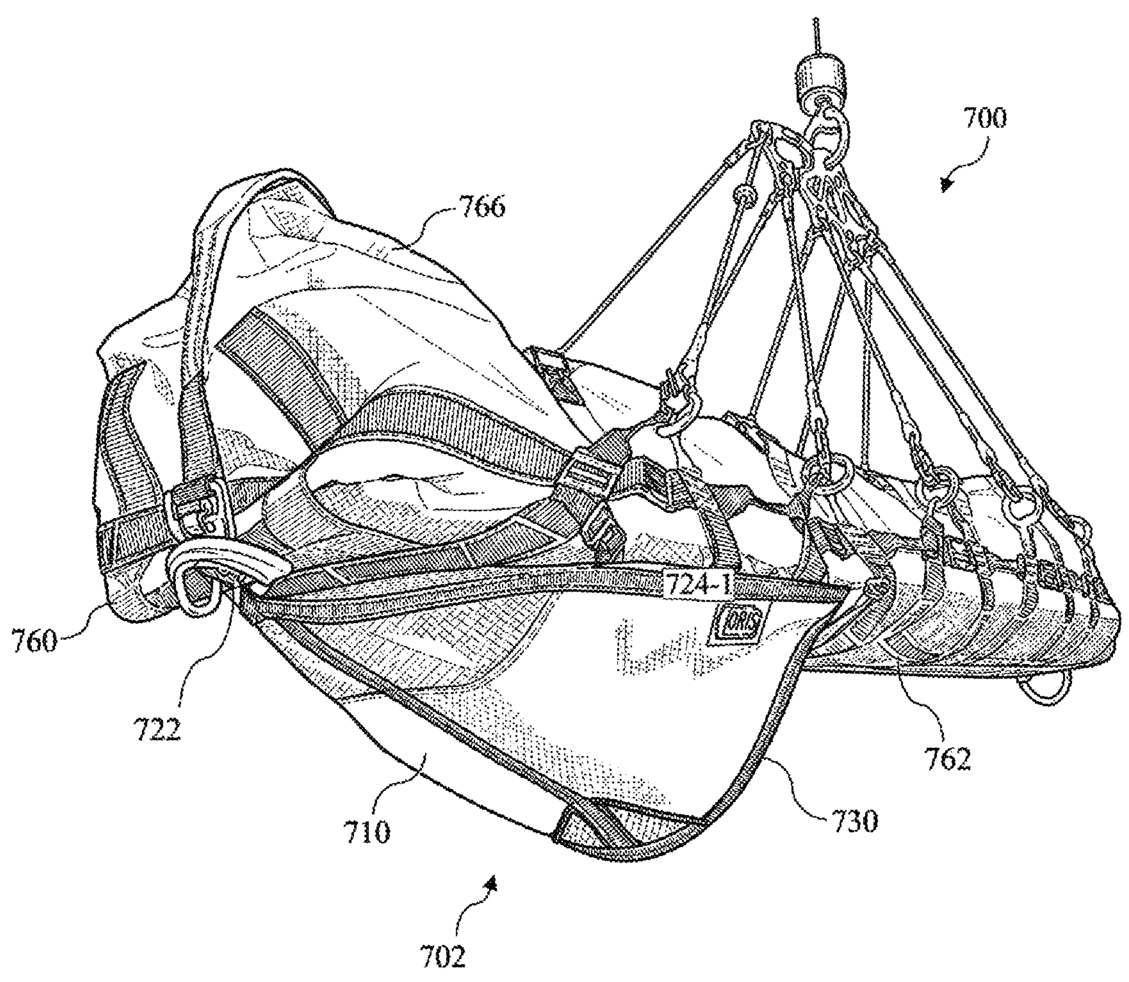
FIG. 7 illustrates an oblique perspective view of an example of a drogue coupled to a litter.

FIG. 7 illustrates system 700 of drogue 702 coupled to rescue litter 760. Drogue 720 may comprise sheet material 710 defining a perimeter edge having a coupling portion and leading edge 730. The coupling portion may comprise trailing edge 722 opposing leading edge 730, and side edge 724-1 extending between leading edge 730 (e.g., the inlet side) and trailing edge 772 (e.g., the aft side).

Drogue 702, when coupled to rescue litter 760 may be positioned below bottom 762 of the rescue litter, i.e., below the ground surface of the litter. Leading edge 730 is not connected to the rescue litter and drapes below bottom 762, while the coupling portion is adjacent bottom 762 at the litter's aft or foot end.

Rescue litter 760 may include fabric cover 766. Fabric cover 766 may protect the load from strong air currents, inclement weather, and airborne debris. Fabric cover 766 may include handles, and connection points for a cabling system. Fabric cover 766 may also provide components of a coupling element to which the drogue can be connected.

Leading edge 730 may project downward from side edge 724-1 at an angle which is not perpendicular to bottom 762 of the rescue litter, but at an angle toward trailing edge 722 (as illustrated) or an angle toward a front end of the rescue litter (not illustrated).

Figures 8A, 8B:
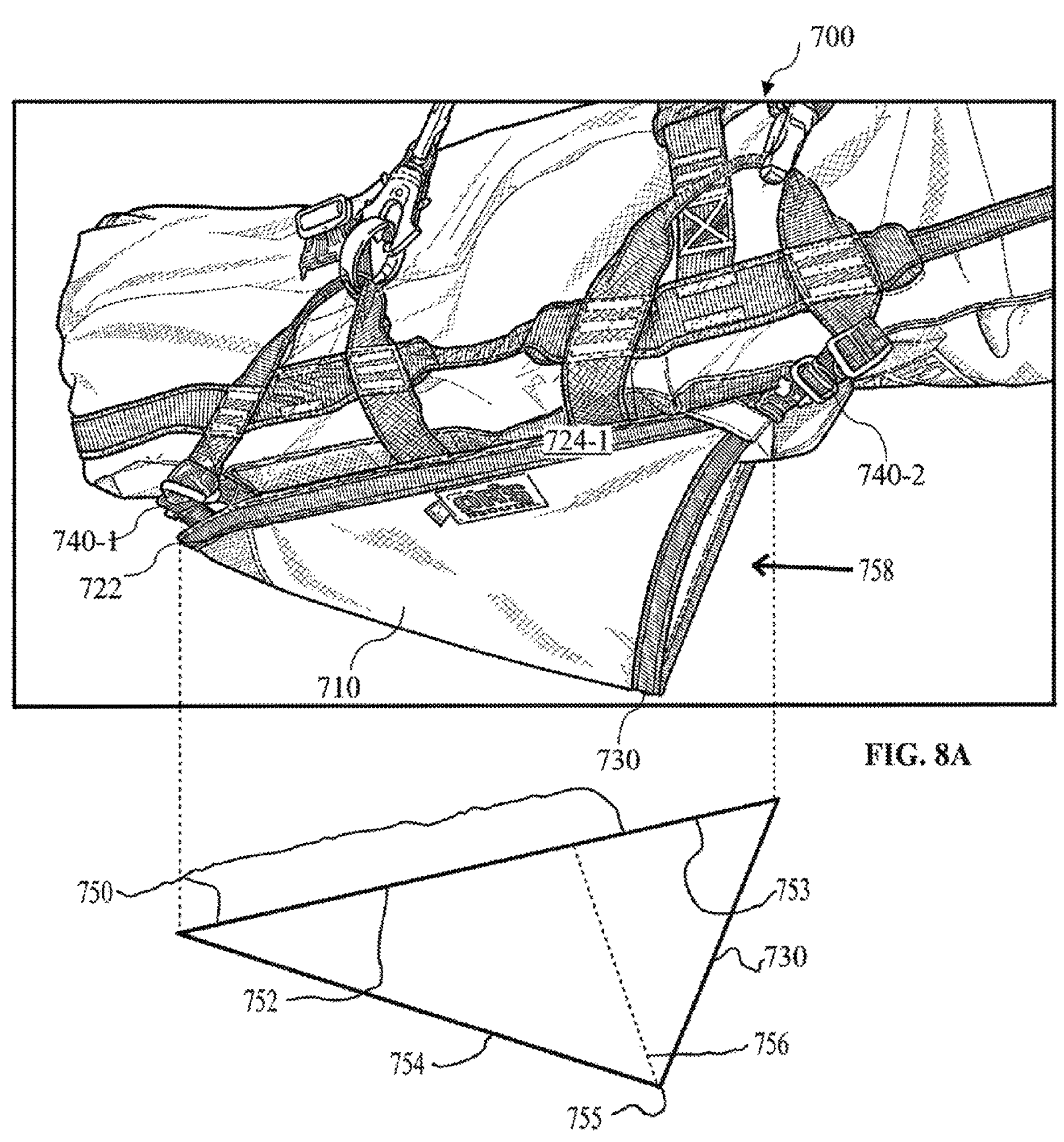
FIG. 8A illustrates an oblique perspective detail of the drogue coupled to a litter of FIG. 7.
FIG. 8B illustrates a cross-section of the drogue coupled to a litter of FIG. 7.

FIG. 8A illustrates a closer side view of system 700 comprising drogue 702 coupled to rescue litter 760. Drogue 702 may include one or more coupling elements 740. A first coupling element 740-1 may be configured to detachably connect trailing edge 722 to an aft end of rescue litter 760. Another coupling element 740-2 may be configured to detachably connect side edge 724-2 to a side of the rescue litter. Coupling element 740-2 may be located at a union of side edge 724-2 and leading edge 730 and may be configured to detachably connect side edge 724-2 and leading edge 730 to a side of the rescue litter. Air scoop 758 may be formed by leading edge 730 and sheet material 710.

FIG. 8B further illustrates a cross-section of drogue 702, comprising chord 750. Chord 750 may span from a roof-leading edge of drogue 702 to roof-trailing edge of drogue 702. Chord 750 may comprise chord leading portion 753 and chord trailing portion 752. In the example illustrated in FIG. 8B, chord leading portion 753 may be one-third the length of chord 750 while chord trailing portion 752 may be two-thirds the length of chord 750.

FIG. 8B further illustrates that leading edge 730 reaches apex 755 at distance 756 from chord 750. Chord 750 may be approximately two to three times, e.g. 2.25 times, distance 756.

FIG. 8B further illustrates airfoil trailing portion 754, tapering from leading edge 730 to trailing edge 722. Airfoil trailing portion 754 may taper uniformly. Airfoil trailing portion 754 and its taper may increase a likelihood that airflow is laminar over airfoil trailing portion 754, may reduce turbulence produced by drogue 702 compared to a drogue with a less aerodynamic cross-section, e.g. a square, rectangular, or semi-circular cross-section, and may produce a downward lift force on drogue 702 and rescue litter 760, e.g. a downward lift force on a foot-end of rescue litter 760, such as when drogue 702 is transported beneath a carrier.

Thereby when a load is transported with drogue 702, drogue 702 may produce drag, downward lift force, and reduced or minimized turbulence all or any of which may reduce or prevent undesirable motion of the load, e.g. of rescue litter 760, in a hoist operation, including a hoist operation in which rescue litter 760 and drogue 702 are transported from a first location to a second location.

Figure 9:
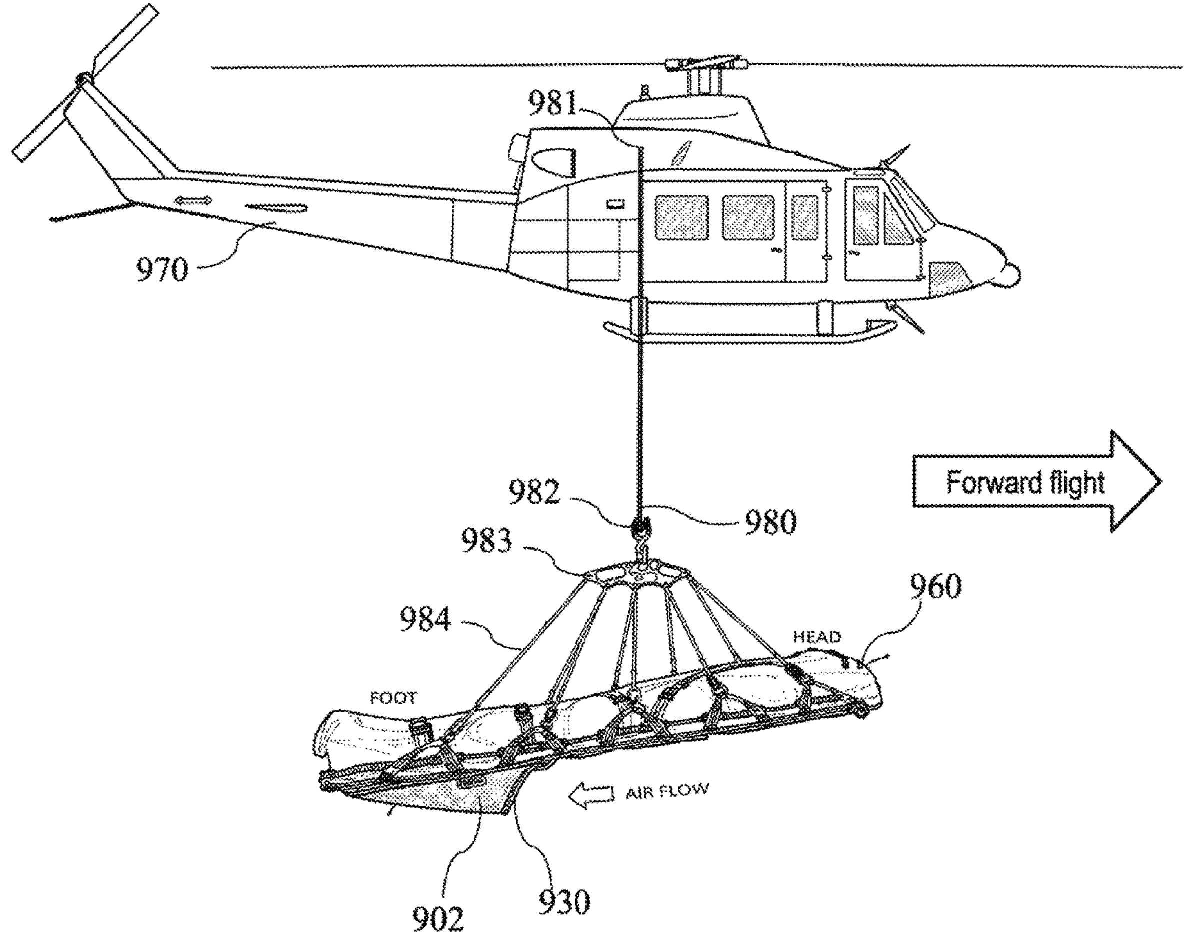
FIG. 9 illustrates an example of a system of a helicopter, cable system, litter and drogue.

FIG. 9 illustrates air transport system 900 that includes helicopter 970, rescue litter 960, cable system 980, and drogue 902. Drogue 902 may be an example of any of the drogues described herein and may be detachably connected to the rescue litter in any of the ways previously described.

Cable system 980 may be configured to detachably couple rescue litter 960 to helicopter 970 such that the rescue litter hangs below the helicopter when the helicopter is in flight, as shown. Cable system 980 may include one end of a cable coupled to the body of the helicopter, for example, to an arm extending from the body of the helicopter so that the cable hangs outside of the landing treads of the helicopter. The cable system 980 may couple at its opposing end to bracket 983. Bracket 983 may include one or more connection points for cables or straps 984 connected to the litter to connect to the bracket. The cable system 980 may be coupled to a winch (not shown), either manual or motorized, to raise or lower the connected rescue litter.

As seen in FIG. 9, when drogue 902 is coupled to rescue litter 960, leading edge 930 is positioned in front of the aft, or foot, side or end of the litter, relative to a forward direction of flight such that air is gathered by a cavity or scoop created by drogue 902 and connected rescue litter 960.

Drogues constructed and used according to the principles described herein therefore provide a quickly attachable air scoop or chute when connected to a litter. When so attached, air flow into or air caught by an exemplary drogue may produce at least one of drag, downward lift force, and minimized turbulence and may thereby stabilize a suspended litter by minimizing rotation and pitch of the litter and may keep the litter aligned with the flight path. This may permit a safer hoisting operation where the helicopter flies during the hoist rather than being required to hover. An exemplary drogue, once coupled to a litter, does not require a human operator to deploy it, and does not need to be repacked before reuse. Rather, it can collapse or flatten under the litter on a surface, and be instantly ready for reuse when the litter is lifted. Further, the exemplary drogue has no cabling or tether that would be subject to tangling with itself or components of the helicopter.

Other Exemplary Embodiments

The examples described above generally concern a drogue parachute for a rescue litter, and related systems and methods. The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

For example, other materials and shapes of the sheet material may be used. Other coupling elements may be used to detachably connect the drogue to the rescue litter. Other inlet opener configurations may be used.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface, and the object remains the same. As used herein, "and/or" means "and" or "or", as well as "and" and "or." Moreover, all patent and non-patent literature cited herein is hereby incorporated by reference in its entirety for all purposes.

And those of ordinary skill in the art will appreciate that the exemplary embodiments disclosed herein can be adapted to various configurations and/or uses without departing from the disclosed principles. Applying the principles disclosed herein, it is possible to provide a wide variety of drogue parachute(s) for a rescue litter, and related systems and methods. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety of drogue parachutes, and related methods and systems that can be devised under disclosed and claimed concepts.

Moreover, nothing disclosed herein is intended to be dedicated to the public regardless of whether such disclosure is explicitly recited in the claims. To aid the Patent Office and any readers of any patent issued on this application in interpreting the claims appended hereto or otherwise presented throughout prosecution of this or any continuing patent application, applicants wish to note that they do not intend any claimed feature to be construed under or otherwise to invoke the provisions of 35 USC 112 (f), unless the phrase "means for" or "step for" is explicitly used in the particular claim.

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more".

Thus, in view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

Following are non-limiting examples:

Example 1. A drogue comprising: a sidewall and a coupling element; wherein the sidewall comprises a sheet material, wherein the sheet material comprises a perimeter edge; wherein the perimeter edge comprises a leading edge, a trailing edge, a first side edge and a second side edge, and a coupling element; wherein the first side edge and the second side edge span from the leading edge to the trailing edge; wherein the coupling element is to detachably secure the drogue to a load; wherein the leading edge and sheet material are to form an air scoop relative to the load; wherein the air scoop is to produce a drag force on the drogue in an airflow, and wherein the coupling element is to transfer the draft force to the load.

Example 2. The drogue according to Example 1 or another example herein, wherein a cross-section of the air scoop from the leading edge to the trailing edge forms an airfoil trailing portion.

Example 3. The drogue according to Example 2 or another example herein, wherein the airfoil trailing portion tapers from the leading edge to the trailing edge.

Example 4. The drogue according to Example 3 or another example herein, wherein the airfoil trailing portion tapers uniformly from the leading edge to the trailing edge.

Example 5. The drogue according to Example 3 or another example herein, wherein the airfoil trailing portion is to at least one of produce a laminar airflow over the airfoil trailing portion, produce a reduced turbulence downstream of the drogue in the airflow, or produce a lift force on the drogue in the airflow.

Example 6. The drogue according to Example 5 or another example herein, wherein the lift force is to pull downward on the drogue and wherein the connecting element is further to transfer the lift force to the load.

Example 7. The drogue according to Example 5 or another example herein, wherein at least one of the drag force, the reduced turbulence downstream of the drogue in the airflow, or the lift force is to increase a likelihood that the load maintains a constant orientation in the airflow.

Example 8. The drogue according to Example 1 or another example herein, wherein the coupling element is to detachably secure the drogue to an aft portion of the load.

Example 9. The drogue according to Example 1 or another example herein, wherein the coupling element is to detachably secure at least one of the trailing edge, the first side edge, and the second side edge to the load.

Example 10. The drogue according to Example 1 or another example herein, wherein the coupling element is to detachably secure to the load a first union of the leading edge with the first side edge and a second union of the leading edge with the second side edge.

Example 11. The drogue according to Example 1 or another example herein, wherein the coupling element comprises at least one of a buckle, a clip, a clasp, a hook, a strap, a carabiner clip, a grommet, a magnet, a zipper, and a hook and loop closure.

Example 12. The drogue according to Example 1 or another example herein, wherein the load comprises a litter.

Example 13. The drogue according to Example 1 or another example herein, wherein the load is to be secured to a carrier.

Example 14. The drogue according to Example 13 or another example herein, wherein the carrier comprises at least one of a helicopter, a fixed wing aircraft, and a crane.

Example 15. The drogue according to Example 1 or another example herein, further comprising an inlet opener, wherein the inlet opener is to bias the leading edge to separate from the load and open the air scoop in the airflow.

Example 16. The drogue according to Example 15 or another example herein, wherein the inlet opener comprises at least one of a channel and a biasing material inside the channel.

Example 17. The drogue according to Example 16 or another example herein, wherein the biasing material comprises at least one of a dense material or a spring.

Example 18. The drogue according to Example 16 or another example herein, wherein the dense material comprises at least one of sand, pebbles, ceramic, or metal filings or ball bearings.

Example 19. The drogue according to Example 16 or another example herein, wherein the spring comprises a bar or coil spring.

Example 20. The drogue according to Example 15 or another example herein, wherein the inlet opener is located along or in at least one of the leading edge or between the leading edge and the trailing edge.

Example 21. The drogue according to Example 1 or another example herein, further comprising a roof, wherein the roof spans between the first side edge, the second side edge, and the trailing edge.

Example 22. The drogue according to Example 1 or another example herein, further comprising a vent opening.

Example 23. The drogue according to Example 22 or another example herein, wherein the vent opening is to produce a reduced turbulence downstream of the drogue in the airflow.

Example 24. The drogue according to Example 22 or another example herein, wherein the vent opening is located in at least one of the following locations: along a span of the sheet material between the leading edge and the trailing edge, at the trailing edge, or between at least one of the first side edge and the second side edge and the load.

Example 25. The drogue according to Example 1 or another example herein, wherein the sheet material comprises at least one of a closed tube or a flat span.

Example 26. The drogue according to Example 1 or another example herein, wherein the sheet material comprises at least one of a woven material or a resiliently compliant material.

Example 27. The drogue according to Example 1 or another example herein, wherein a length of the trailing edge corresponds to a dimension of a proximate portion of the load.

Example 28. The drogue according to Example 1 or another example herein, wherein a length of the trailing edge is shorter than a length of the leading edge.

Example 29. The drogue according to Example 28 or another example herein, wherein the length of the leading edge is between 1.2 and 4.5 times the length of the trailing edge.

Example 30. The drogue according to Example 1 or another example herein, wherein the load comprises a litter, wherein the litter comprises a fabric cover, and wherein the drogue is integrated into the fabric cover.

Example 31. An air transport system comprising: a litter; and a drogue comprising a sidewall and a coupling element; wherein the sidewall comprises a sheet material, wherein the sheet material comprises a perimeter edge; wherein the perimeter edge comprises a leading edge, a trailing edge, a first side edge and a second side edge, and a coupling element; wherein the first side edge and the second side edge span from the leading edge to the trailing edge; wherein the coupling element is to detachably secure the drogue to the litter; wherein the leading edge and sheet material are to form an air scoop relative to the load; wherein the leading edge is not connected to the litter; wherein the air scoop is to produce a drag force on the drogue in an airflow, and wherein the coupling element is to transfer the draft force to the load.

Example 32. An air transport system comprising: a helicopter, a litter, a cable system, and a drogue; wherein the cable system is to detachably couple the litter to the helicopter such that the litter is suspended below the helicopter when the helicopter is in flight; wherein the drogue comprises a sidewall and a coupling element; wherein the sidewall comprises a sheet material, wherein the sheet material comprises a perimeter edge; wherein the perimeter edge comprises a leading edge, a trailing edge, a first side edge and a second side edge, and a coupling element; wherein the first side edge and the second side edge span from the leading edge to the trailing edge; wherein the coupling element is to detachably secure the drogue to a load; wherein the leading edge and sheet material are to form an air scoop relative to the load; wherein the air scoop is to produce a drag force on the drogue in an airflow, and wherein the coupling element is to transfer the draft force to the load, and wherein the leading edge is positioned proximate to an aft end of the litter relative to a forward direction of flight of the helicopter.

The invention claimed is:

1. A drogue comprising: a sidewall and a coupling element; wherein the sidewall comprises a sheet material, wherein the sheet material comprises a perimeter edge; wherein the perimeter edge comprises a leading edge, a trailing edge, a first side edge and a second side edge, and the coupling element; wherein the first side edge and the second side edge span from the leading edge to the trailing edge; wherein the coupling element is to detachably secure the drogue to a load; wherein the leading edge and sheet material are to form an air scoop relative to the load; wherein the leading edge is to be perpendicular to a major axis of the load wherein the trailing edge is affixed to a foot end of the load; wherein an opening of the air scoop formed by the leading edge faces the head end of the load; further comprising an collapsable inlet opener, wherein the collapsable inlet opener comprises channel in the leading edge and biasing material inside the channel, wherein the biasing material comprises a dense material, wherein the collapsable inlet opener is to bias the leading edge to separate from the load and open the air scoop in the airflow due to gravity acting on the dense material; wherein the air scoop is to produce a drag force on the drogue in an airflow, wherein the coupling element is to transfer the drag force to the load.

2. The drogue according to claim 1, wherein a cross-section of the air scoop from the leading edge to the trailing edge forms an airfoil trailing portion.

3. The drogue according to claim 2, wherein the airfoil trailing portion tapers from the leading edge to the trailing edge.

4. The drogue according to claim 3, wherein the airfoil trailing portion is to at least one of produce a laminar airflow over the airfoil trailing portion, produce a reduced turbulence downstream of the drogue in the airflow, or produce a lift force on the drogue in the airflow.

5. The drogue according to claim 4, wherein the lift force is to pull downward on the drogue and wherein the connecting element is further to transfer the lift force to the load.

6. The drogue according to claim 4, wherein at least one of the drag force, the reduced turbulence downstream of the drogue in the airflow, or the lift force is to increase a likelihood that the load maintains a constant orientation in the airflow.

7. The drogue according to claim 1, wherein the coupling element is to detachably secure at least one of the trailing edge, the first side edge, and the second side edge to the load.

8. The drogue according to claim 1, wherein the coupling element is to detachably secure to the load a first union of the leading edge with the first side edge and a second union of the leading edge with the second side edge.

9. The drogue according to claim 1, wherein the coupling element comprises at least one of a buckle, a clip, a clasp, a hook, a strap, a carabiner clip, a grommet, a magnet, a zipper, and a hook and loop closure.

10. The drogue according to claim 1, wherein the load is to be secured to a carrier, wherein the carrier comprises at least one of a fixed wing aircraft, a rotorcraft, a line-system, and a crane.

11. The drogue according to claim 1, wherein the biasing material further comprises a spring, wherein the spring is to open the air scoop in the airflow.

12. The drogue according to claim 1, wherein the dense material comprises at least one of sand, pebbles, ceramic ball bearings, metal ball bearings.

13. The drogue according to claim 1, further comprising a roof, wherein the roof spans between the first side edge, the second side edge, and the trailing edge.

14. The drogue according to claim 1, further comprising a vent opening, wherein the vent opening is to produce a reduced turbulence downstream of the drogue in the airflow.

15. The drogue according to claim 1, wherein a length of the trailing edge is shorter than a length of the leading edge.

16. An air transport system comprising: a litter and a drogue; wherein the drogue comprises a sidewall and a coupling element; wherein the sidewall comprises a sheet material, wherein the sheet material comprises a perimeter edge; wherein the perimeter edge comprises a leading edge, a trailing edge, a first side edge and a second side edge, and a coupling element; wherein the first side edge and the second side edge span from the leading edge to the trailing edge; wherein the coupling element is to detachably secure the drogue to the litter; wherein the leading edge and sheet material are to form an air scoop relative to the litter; wherein the leading edge is not connected to the litter; wherein the leading edge is perpendicular to the litter wherein the trailing edge is affixed to a foot end of the litter; wherein an opening of the air scoop formed by the leading edge faces the head end of the litter; further comprising a collapsable inlet opener, wherein the collapsable Inlet opener comprises a channel in the leading edge and a biasing material inside the channel, wherein the biasing material comprises a dense material, wherein the collapsable inlet opener is to bias the leading edge to separate from the litter and open the air scoop in the airflow due to gravity acting on the biasing material; wherein the air scoop is to produce a drag force on the drogue in an airflow, and wherein the coupling element is to transfer the drag force to the litter.

17. An air transport system comprising: a helicopter, a litter, a cable system, and a drogue; wherein the cable system is to detachably couple the litter to the helicopter such that the litter is suspended below the helicopter when the helicopter is in flight; wherein the drogue comprises a sidewall and a coupling element; wherein the sidewall comprises a sheet material, wherein the sheet material comprises a perimeter edge; wherein the perimeter edge comprises a leading edge, a trailing edge, a first side edge and a second side edge, and a coupling element; wherein the first side edge and the second side edge span from the leading edge to the trailing edge; wherein the coupling element is to detachably secure the drogue to the litter; wherein the leading edge and sheet material are to form an air scoop relative to the litter; wherein the leading edge is perpendicular to the litter wherein the trailing edge is affixed to a foot end of the load; wherein an opening of the air scoop formed by the leading edge faces the head end of the litter; further comprising a collapsable inlet opener, wherein the collapsable inlet opener comprises a channel in the leading edge and a biasing material inside the channel, wherein the biasing material comprises a dense material, wherein the collapsable inlet opener is to bias the leading edge to separate from the litter and open the air scoop in the airflow due at least in part to a force of gravity acting on the dense material; wherein the air scoop is to produce a drag force on the drogue in an airflow, and wherein the coupling element is to transfer the drag force to the litter, and wherein the leading edge is positioned proximate to an aft end of the litter relative to a forward direction of flight of the helicopter.

* * * * *